G. W. DUNHAM.
STABILIZER.
APPLICATION FILED MAR. 8, 1916.
1,327,811.
Patented Jan. 13, 1920.
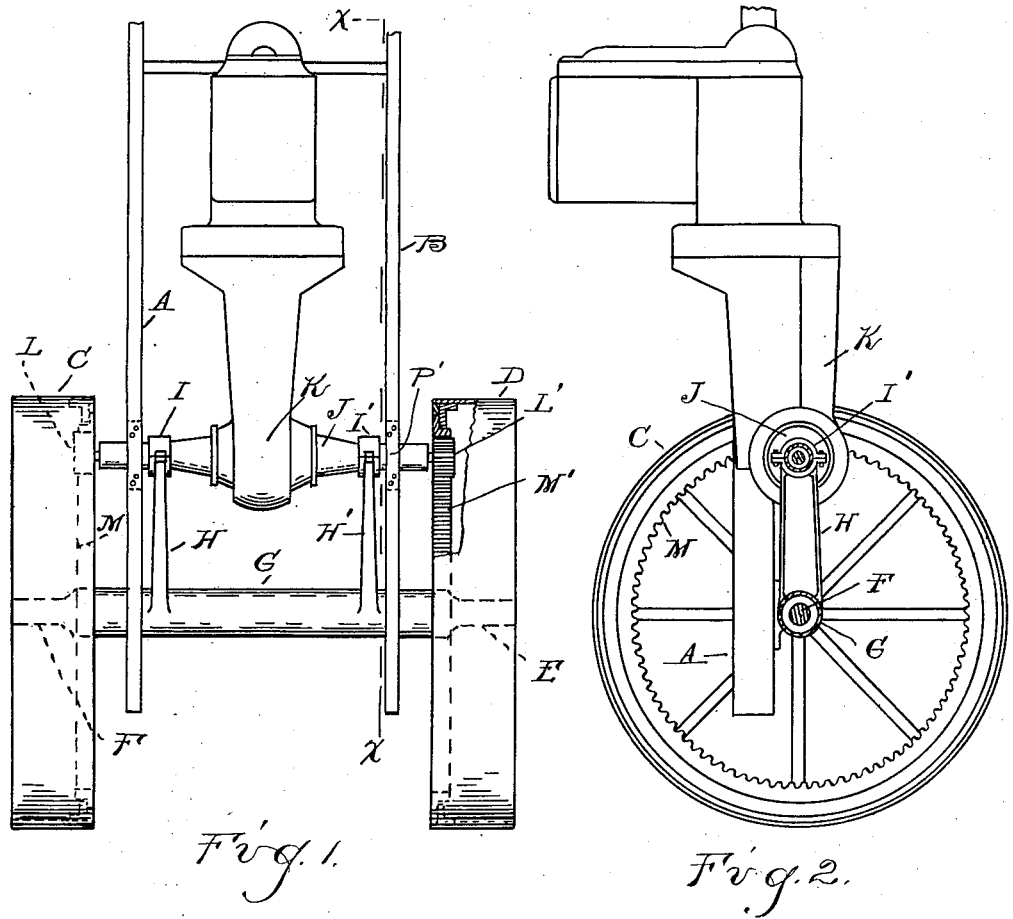
Inventor
George W. Dunham
By Whittemore Hulbert Whittemore
Attorney

UNITED STATES PATENT OFFICE.

GEORGE W. DUNHAM, OF DETROIT, MICHIGAN, ASSIGNOR TO GRAHAM BROTHERS, OF EVANSVILLE, INDIANA, A CORPORATION OF INDIANA.

STABILIZER.

1,327,811.   Specification of Letters Patent.   Patented Jan. 13, 1920.

Application filed March 8, 1916. Serial No. 82,994.

*To all whom it may concern:*

Be it known that I, GEORGE W. DUNHAM, a citizen of the United States of America, residing at Detroit, in the county of Wayne and State of Michigan, have invented certain new and useful Improvements in Stabilizers, of which the following is a specification, reference being had therein to the accompanying drawings.

This invention relates to stabilizers for tractors or the like, and more particularly to a mechanism for preventing the rocking of the frame generally produced in devices of this character, by the torsional movement of the parts.

The invention has among its objects to provide an effective means for holding the ends of the jack-shaft in the same relative position to the axis of the drive-wheels; to prevent the spur gear on the end of the jack-shaft from climbing up the large gear with which it meshes, without a corresponding movement of the spur gear on the opposite end of the shaft; to provide a stabilizer which can be economically manufactured and will rigidly hold the parts in the proper relative position; and in general, to provide an improved stabilizer which will prevent any undue torsional movement and transfer the tendency to torsional movement to vertical movement. The invention further resides in various features of construction and such combinations of parts as will more fully hereinafter appear.

In the drawings,—

Figure 1 is a top plan view of a tractor embodying my invention;

Fig. 2 is a section on line $x$—$x$ of Fig. 1.

Describing in detail the particular embodiment of my invention shown in the drawings, A and B designate the side sills of the tractor and C and D the drive wheels. The latter are mounted upon the ends E and F of the axle supported in the housing G. The latter is preferably hollow and rigidly secured thereto is a pair of arms H H'. These arms and the housing G are sufficiently heavy to prevent any material relative movement between the bearings I I' carried by the forward ends of the arms H H' respectively. Through these bearings or sleeves extends a jack-shaft J driven from the usual transmission contained within the transmission housing K. At its opposite ends the jack-shaft is provided with spur gears L L'. In the particular construction shown, these gears mesh with large internal gears M M' secured to the inner face of the rim of the wheels C and D. The jack-shaft housing may be tied to the side sills A and B as indicated by P P', or it may be tied only to the bearings or sleeves I I'.

The engine and transmission housing K may have the usual three-point suspension, and the present novel construction of stabilizer will prevent the rocking movement usually resulting from the torsional movement of the frame in devices of this character. Whenever there is a torsional strain upon the jack-shaft, in place of one of the spur gears L L' running up upon its respective internal gear M M' and causing a side twisting of the frame, this torsional movement is prevented by the arms H H' and the housing G. If the end of the jack-shaft carrying the spur gear L' does move upward, it will rock the end of the arm H' which carries the bearing I' upward, and through the rigid connection of this arm to the housing G and the latter to the arm H, it will cause a similar vertical movement to the bearing end I of the arm H. Since these arms rock about the same axis as the drive wheels, the position of the spur gears relative to the drive wheels will be maintained and if there is any movement produced, it will be in a vertical direction. In most cases the frame or sills will be sufficiently rigid to prevent any substantial vertical movement. In driving heavy tractors, the rocking from side to side produced by the torsional strains often become excessive, and the present construction of stabilizer effectively overcomes this objection. However, I do not desire to limit the invention to the details of construction shown and described.

What I claim as my invention is:—

1. The combination with drive wheels, of a frame, an axle housing, a jack-shaft extending transversely of said frame and having means at its opposite ends for driving said wheels, means upon said frame for tying said jack-shaft thereto, and a stabilizer comprising rigid arms fixed to said axle housing, said arms having bearings fixed in relation to the jack-shaft.

2. The combination with a frame and drive wheels, of a jack-shaft tied near its opposite ends to said frame and adapted to drive said wheels, and a stabilizer for preventing movement of one end of said jack-shaft without a corresponding movement of the other end of the jack-shaft, comprising rigid arms arranged in fixed relation to the jack-shaft, and in rigid relation to each other.

3. The combination with a frame and drive wheels, each having an internal gear, of a jack-shaft tied near its opposite ends to said frame and having pinions to drive said wheels, and a stabilizer for preventing movement of one end of the jack-shaft without a corresponding movement of the other end of the jack-shaft, comprising rigid arms arranged in fixed relation to the axis of the drive wheels and in rigid relation to each other, said arms being provided with bearings for holding the jack-shaft substantially parallel to the axis of the wheels.

In testimony whereof I affix my signature in presence of two witnesses.

GEORGE W. DUNHAM.

Witnesses:
J. F. LOOP,
C. E. GREGORY.